United States Patent [19]

Iwanaga

[11] Patent Number: 5,648,945
[45] Date of Patent: Jul. 15, 1997

[54] OPTICAL INFORMATION RECORDING/REPRODUCING APPARATUS

[75] Inventor: Ryuichi Iwanaga, Tokyo, Japan

[73] Assignee: Canon Kabushiki Kaisha, Tokyo, Japan

[21] Appl. No.: 492,692

[22] Filed: Jun. 20, 1995

[30] Foreign Application Priority Data

Jun. 21, 1994 [JP] Japan ............... 6-138640

[51] Int. Cl.$^6$ ............... G11B 7/00
[52] U.S. Cl. ............... 369/44.14; 369/44.38; 369/44.37; 369/44.17
[58] Field of Search ............... 369/44.11, 44.13, 369/44.14, 44.15, 44.17, 44.37, 44.38; 359/241

[56] References Cited

U.S. PATENT DOCUMENTS

| | | | |
|---|---|---|---|
| 5,107,478 | 4/1992 | Tamaru et al. | 369/44.32 |
| 5,373,437 | 12/1994 | Itoh et al. | 364/44.32 |
| 5,493,554 | 2/1996 | Sasaki et al. | 369/110 |
| 5,513,121 | 4/1996 | Sugawara et al. | 369/44.14 |

*Primary Examiner*—Mark Hellner
*Attorney, Agent, or Firm*—Fitzpatrick, Cella, Harper & Scinto

[57] ABSTRACT

An optical information recording/reproducing apparatus includes a light source unit for emitting plural light beams for information recording and/or reproduction toward an optical information recording medium, an optical head on which the light source unit is mounted, and a frame of the apparatus on which the optical head is mounted. The apparatus is further provided with an adjusting mechanism for adjusting the positional relationship of the plural light beams relative to the optical information recording medium. The adjusting mechanism is formed at the mounting portion of the optical head and the frame of the apparatus.

8 Claims, 8 Drawing Sheets

# 5,648,945

OPTICAL INFORMATION RECORDING/REPRODUCING APPARATUS

BACKGROUND OF THE INVENTION

1. Field of the Invention

The present invention relates to an optical information recording/reproducing apparatus for recording and/or reproducing information with a laser beam, and more particularly to an optical information recording/reproducing apparatus provided with a beam rotation adjusting mechanism for precisely adjusting, in irradiating a track of an optical recording medium with plural laser beams for recording and/or reproduction, the positional relationship of the irradiating beams with respect to the track.

2. Related Background Art

Conventional information recording on a magneto-optical recording medium is achieved by moving a light beam emitted from a light source to a desired track on a disk (magneto-optical recording medium), then switching the light beam to an erasing power at a designated position and simultaneously applying an external bias magnetic field to the recording surface of the disk, thereby erasing the information recorded in the portion irradiated with the erasing power, and then switching the bias magnetic field to a direction opposite to that during erasure, and irradiating the above-mentioned erased portion with a light beam modulated according to a recording information signal, thereby recording the information on the recording surface of the disk. After the recording, the light beam is switched again to the reproducing power, and reproduction (verification) is conducted to check for errors in the data of thus recorded portion, and the recording operation of a cycle is completed upon confirmation of the coincidence of the recorded data and the reproduced data.

As explained in the foregoing, the information recording on the disk requires three operations of erasure/recording/reproduction, and there is required an even longer time in consideration of the time for awaiting the rotation of the disk in each operation. For this reason there has already been proposed overwriting technology, which can be generally classified into the magnetic field modulation method and the optical modulation method. In the former, a magnetic head for applying a bias magnetic field is positioned in facing relationship to the disk, and a light beam at the recording power irradiates the recording surface of the disk in a continuous or pulsed manner while the direction of the bias magnetic field applied by the magnetic head is modulated according to the information recording signal, whereby the erasure and recording of information are simultaneously conducted. This method, being capable of achieving erasure and recording of the information in one operation, can achieve the recording operation, even including the subsequent verifying operation, in a time equal to ⅔ of the time required in the foregoing method.

Also there is being developed a method of simultaneously irradiating a track of the disk with plural recording/reproducing laser beams from a laser array constituting the light source, and effecting the information recording with a recording beam while effecting the verification by a reproducing beam positioned therebehind on the track. This method enables further reduction in time, as all the recording operations (erasure, recording and reproduction) are conducted within one operation.

However, such a method employing the laser array requires new adjusting means for rotating the laser beams for precise positional adjustment, as the track has to be exactly irradiated with the laser beams.

In such optical information recording/reproducing apparatus, for irradiating the desired information track on the optical information recording medium with plural beam spots, there has been employed a configuration as shown in FIG. 1.

Referring to FIG. 1, a turntable 102 supports and rotates a disk-shaped optical information recording medium 101. An optical system, for irradiating the disk-shaped optical information recording medium 101 on the turntable 102 is composed of a fixed optical system, fixed to the apparatus, and a movable optical system including, for example, an objective lens 106 driven in the radial direction of the recording medium 101 (tracking direction of the beam spots) by an actuator (not shown) and a mirror 105 mounted on a carriage (not shown) driven in the radial direction of the recording medium for example by a linear motor (not shown).

In the above-mentioned fixed optical system 103, a two-beam semiconductor laser array 301 emits two laser beams, which are supplied, through a collimating lens 302 and a polarizing prism 303, to an image rotating element 104. The light image is rotated about the reference optical path by the image rotating element 104 and is directed to the mirror 105. In the above-mentioned movable optical system, the mirror 105 deflects the above-mentioned laser beams to a direction perpendicular to the recording surface of the recording medium 101, and the above-mentioned objective lens 106 condenses desired beam spots on the recording surface of the recording medium 101.

The reflected light from the recording medium 101 returns from the movable optical system to the fixed optical system, then guided through the image rotating element 104 to the polarizing prism 303, is further guided through the condenser lens 305 or through a ½-wavelength plate 304, another polarizing prism 303, the condenser lens 305 and a cylindrical lens 306, and is supplied to photosensors 307a, 307b, 307c. The above-mentioned image rotating element 4 is usually composed of an image rotating prism.

The photosensor 307a is used for obtaining information for the APC (auto power control) of the two-beam semiconductor laser array 301. One of the two beam spots on the recording medium 101 is used for servo control, such as tracking and focusing, of the beam spots relative to the information track, and the corresponding servo information is obtained from the photosensor 307b. A reproduced signal of the read information is obtained from the photosensor 307c.

The initial tracking adjustment of the beam spots on the recording surface of the recording medium 101 can be achieved by rotating the above-mentioned image rotating element 104 in a direction C. There are known two methods, as shown in FIGS. 2 and 3, in the beam spot formation on the information track. In a method shown in FIG. 2, two beam spots are formed on a same information track, and the information is recorded with a beam spot b, while the recorded information is read and directly verified by an immediately following beam spot a. In a method shown in FIG. 3, two beam spots irradiate different information tracks and simultaneously effect information recording and reading.

For obtaining a necessary and sufficient recording or reproducing ability, the two beam spots have to be aligned with the desired information track, with a precision of the order of a sub-micron. For this purpose, the rotating mechanism for the above-mentioned image rotating element 104 has to be highly precise and to have a high resolving power.

FIG. 4 is a perspective view of a rotating mechanism for the image rotating prism conventionally constituting the image rotating element 104. The image rotating prism 104 adheres to a rotating seat 401, which is rotatably supported by a mounting plate 403 fixed to the frame of the aforementioned fixed optical system 103. The mounting plate 403 is provided with reducing gears 404 and a worm gear 406, which meshes with a gear portion 402 formed on the rotating seat 401. The rotation of the gear 405 by a wrench is reduced by the above-mentioned gears whereby the rotating seat 401 rotates and the beam spots effect a rotational movement by a small angle.

However, in such conventional configuration, since the initial fine tracking adjustment is conducted solely by the mechanism for rotating the image rotating element, the rotating mechanism is required to have a high precision and a high sensitivity for adjustment. For this reason there result drawbacks such as the complexity of the apparatus and a high cost, and the increased time required for adjustment. Also an added reflecting surface in the optical path of the optical system generates a phase difference, thus causing a deterioration of the signal reproducing performance.

SUMMARY OF THE INVENTION

An object of the present invention is to provide an optical information recording/reproducing apparatus capable of simplifying the configuration of the beam rotation adjusting mechanism, therein reducing the cost of the drive mechanism.

This object can be attained, according to the present invention, by an optical information recording/reproducing apparatus for information recording and/or reproduction, comprising a beam rotation adjusting mechanism for adjusting the positional relationship of plural independent laser beams from a laser array so as to simultaneously irradiate a track of an optical recording medium with the laser beams, wherein the beam rotation adjusting mechanism is provided at the mounting position of a fixed-side optical head to the frame of the apparatus. For example a projecting portion provided at the beam exit of the fixed-side optical head is supported, so as to be rotatable about the optical axis of the beams, by a hole or a recess provided in the frame of the apparatus.

Such a configuration dispenses with the conventional complicated adjusting mechanism, as the rotational adjustment of the beams is conducted, by the rotation of the entire fixed-side optical head, on the emerging optical axis toward the movable-side optical head.

Also according to the present invention, the above-mentioned beam rotation adjusting mechanism is advantageously composed of a hollow cylindrical part provided at the light beam exit of the fixed-side optical head so as to be coaxial with the emerging optical axis, and a receiving part provided on the frame of the apparatus so as to be in contact with the circumference, or a part thereof, of said hollow cylindrical part.

Also according to the present invention, the rotational adjustment of the fixed-side optical head and the frame of the apparatus is conducted by eccentric pin means, and, after the adjustment, the fixed-side optical head is fixed to the frame of the apparatus by a screw or by adhesion. For example, the end portion of an eccentric pin is inserted into a hole provided in the frame of the apparatus, and the eccentric pin is rotated about the end portion, whereby the lateral face of the eccentric pin impinges on a part of the fixed-side optical head to vertically displace the same, thereby achieving the adjustment.

Furthermore, according to the present invention, the beam rotation adjusting mechanism is provided with a reed member horizontally extending from the frame of the apparatus, the reed member horizontally extending from a lateral end portion of the fixed-side optical head, an elastic member provided between the reed members, and a screw member connecting the reed members against the elastic force of the elastic member, wherein the fixed-side optical head is biased in rotation of fixed-side optical head relative to the frame of the apparatus is adjusted by the tightening amount of the screw member.

DETAILED DESCRIPTION OF THE PREFERRED EMBODIMENTS

Figure 1:
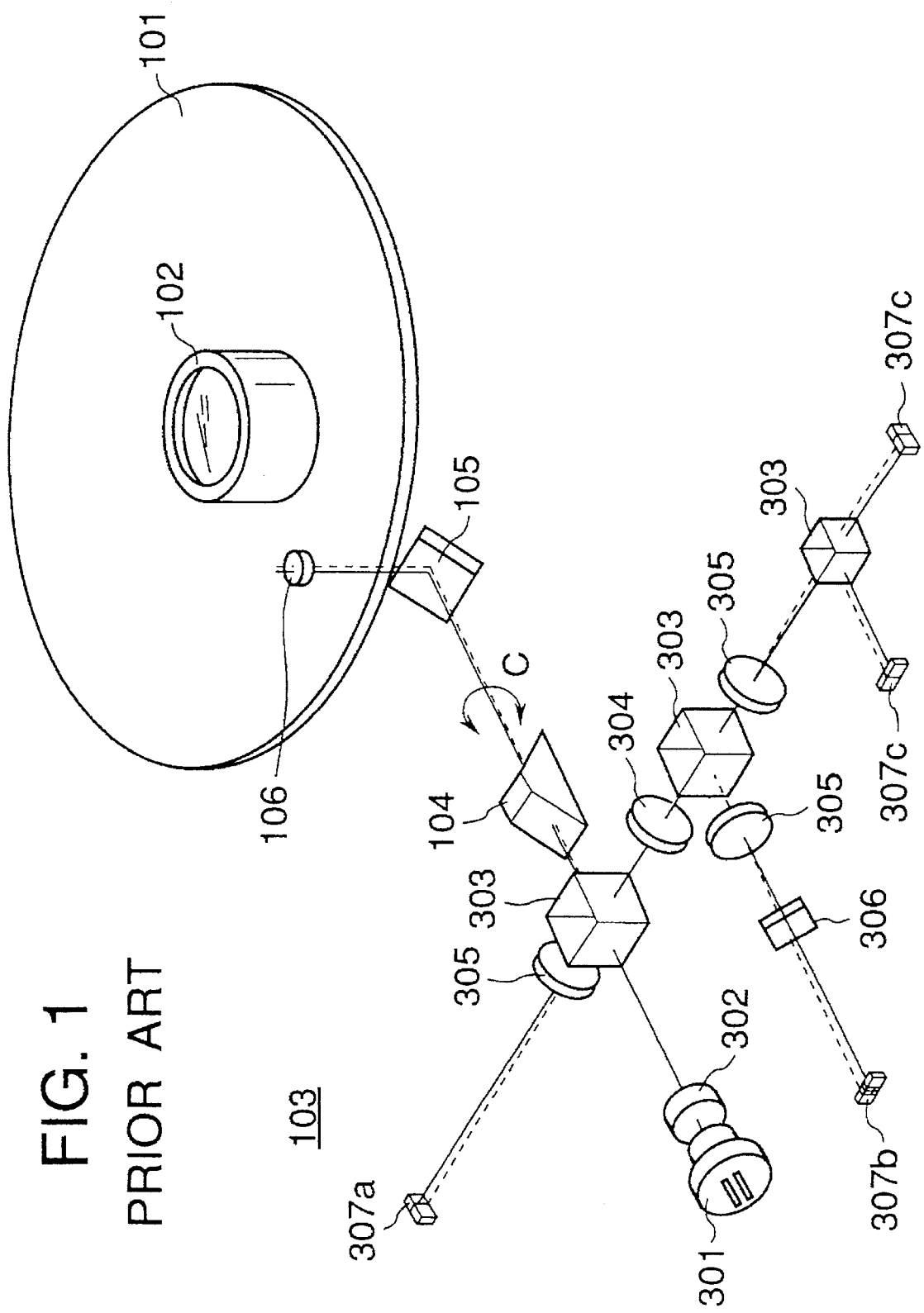
FIG. 1 is a schematic view of a conventional optical information recording/reproducing apparatus.
Figure 2:
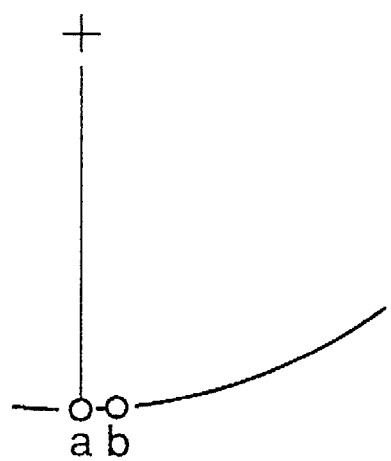
FIGS. 2 and 3 are views showing the arrangement and function of the beam spots in conventional configurations.
Figure 3:
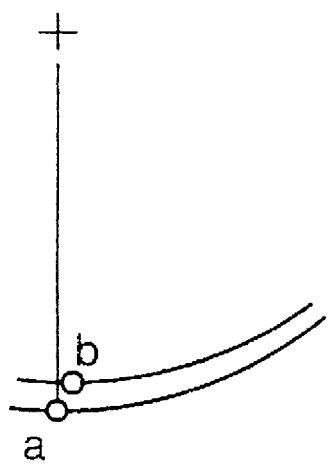
Figure 4:
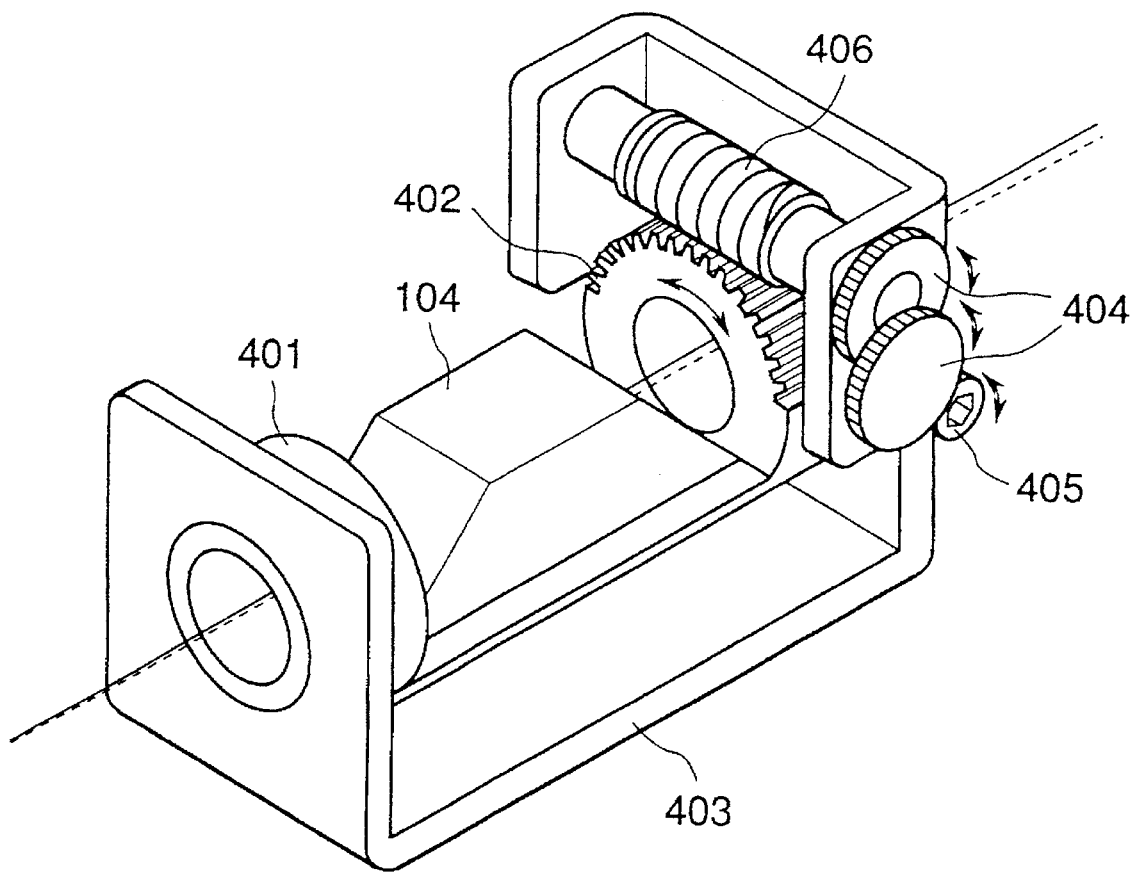
FIG. 4 is a perspective view showing a rotating mechanism for an image rotating prism conventionally constituting the image rotating element.
Figure 5:
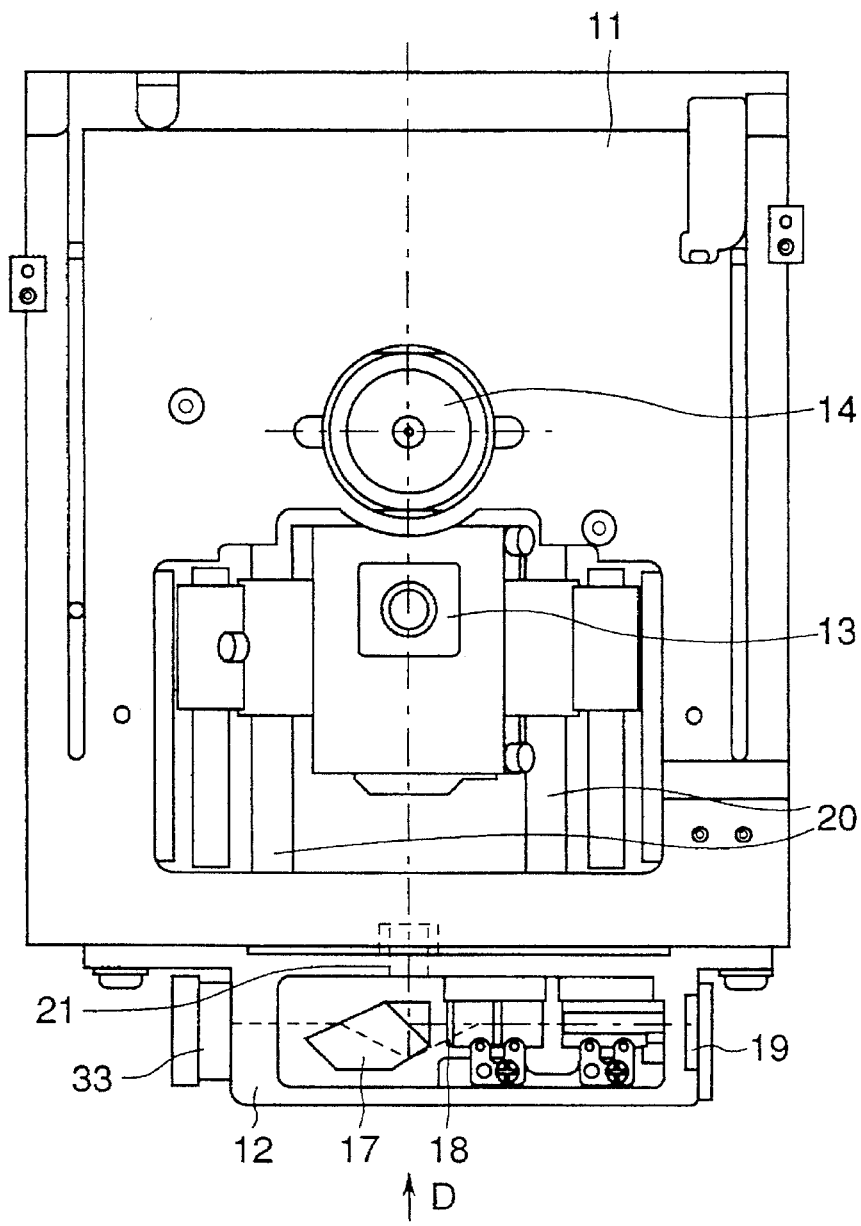
FIG. 5 is a plan view of a drive unit for the optical information recording/reproducing apparatus constituting a first embodiment of the present invention.
Figure 6:
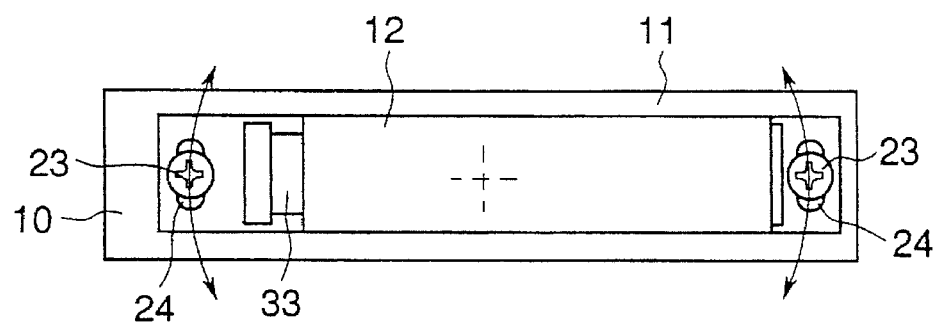
FIG. 6 is a rear-side view thereof.
Figure 7:
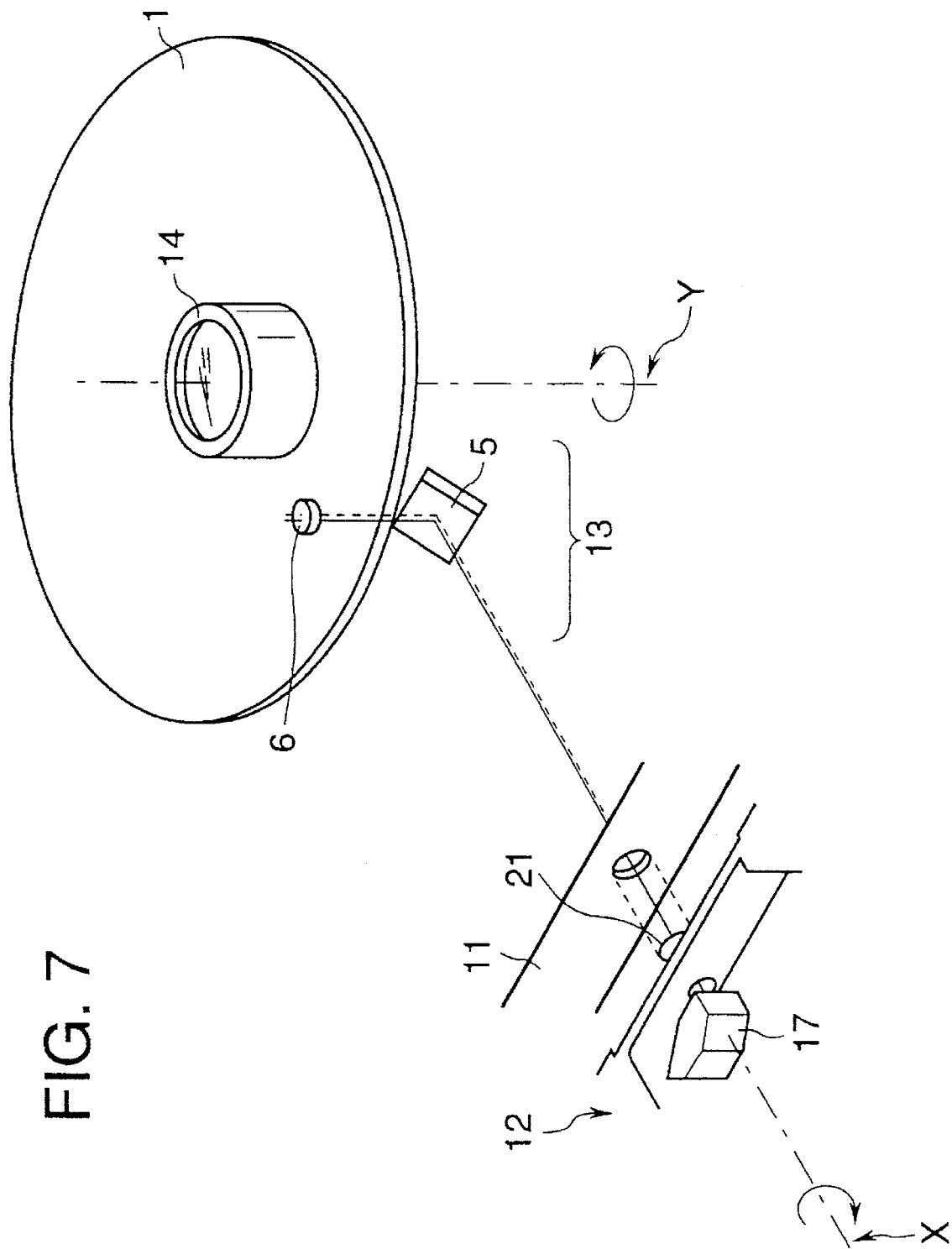
FIG. 7 is a perspective view thereof.

Now the present invention will be described by an embodiment of the optical information recording/reproducing apparatus, with reference to the attached drawings. FIGS. 5, 6 and 7 illustrate a first embodiment of the present invention, wherein shown are a frame 11 of the disk apparatus; a fixed optical unit 12; a pick-up unit (movable-side optical head) 13; and a spindle motor 14 for rotating the disk. On the fixed optical unit 12 there are mounted a holder 33 supporting a semiconductor laser array, optical elements, a sensor 19, etc.

The optical system in the fixed optical unit 12 is constructed as follows. For effecting information recording on and/or reproduction from a disk-shaped optical recording medium, plural light beams emitted from the semiconductor laser array enter a beam shaping prism 17, then are directed from a light exit 18 of the fixed optical system toward the center of the spindle, and are emitted parallel to a guide rail 20. In the above-mentioned optical path, there is provided a pick-up unit 13 movable in the radial direction of the disk, whereby the light beams are deflected, by an upward-reflecting mirror 5, perpendicularly toward the recording surface of a disk-shaped optical recording medium 1 (hereinafter simply called disk) and irradiate the disk through an objective lens 6. The light beams reflected by the disk travel back on the same path, then are reflected in a prism 17, are transmitted by a condenser lens 18 and are received by a sensor 19. The pick-up unit 13 is movably supported by the guide rail 20 mounted in the frame 11 of the apparatus. Thus, the pick-up unit 13 is rendered movably with respect to the frame of the apparatus.

FIG. 6 is a view of the first embodiment shown in FIG. 5, seen from a direction D, and FIG. 7 is a perspective view of a part of the components of the first embodiment.

An adjusting mechanism, for adjusting the positional relationship of the plural beams relative to the disk-shaped optical recording medium 1, is provided at the mounting position of the fixed-side optical head 12 to the frame 11 of the apparatus. More specifically, it effects adjustment by rotating the fixed-side optical head 12 about the mounting position. The rotary axis (X) of the fixed-side optical head 12 is so provided as to be perpendicular to the rotary axis (Y) of the spindle motor 14.

Figure 8A:
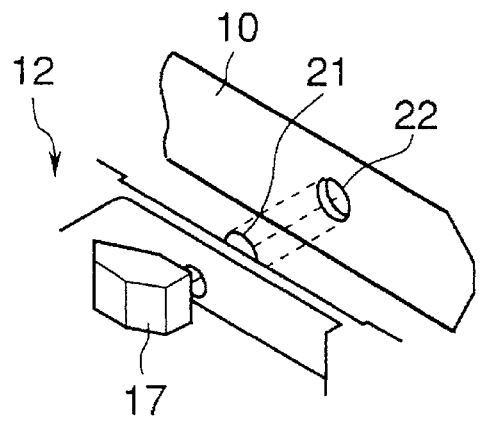
FIGS. 8A and 8B are exploded perspective views of a rotatable support part for a fixed optical unit.
Figure 8B:
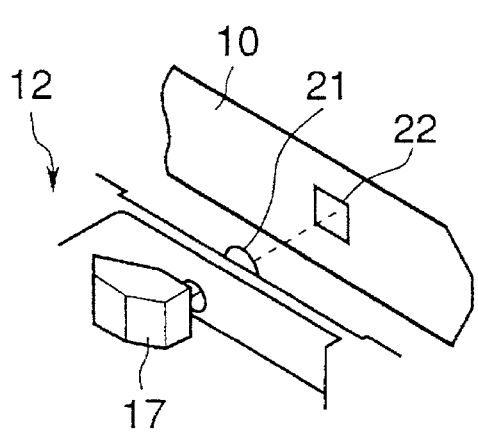

At the assembly of the optical information recording/reproducing apparatus, the plural light beams irradiating the disk have be so adjusted that they are positioned on a track, and a support member has to be provided at the exit part of the fixed optical unit 12, in order to fix the position of the emerging optical axis. In the present embodiment, as shown in FIGS. 8A and 8B, a cylindrical projection 21 externally coaxial with the emerging optical axis is formed on the fixed optical unit 12, while a recess or a hole 22, fitting with the external periphery of the cylindrical projection 21 is provided on a face 10, for mounting the fixed optical unit, of the frame 11 of the apparatus, whereby the fixed optical unit can be supported without displacement of the optical axis at the adjustment. The fixed optical unit 12 is provided, as shown in FIG. 6, with elongated holes 24 concentric with the emerging optical axis and covering the adjustment range of beam rotation, and is fixed to the frame 11 of the apparatus with screws 23 after the completion of adjustment.

Figure 9:
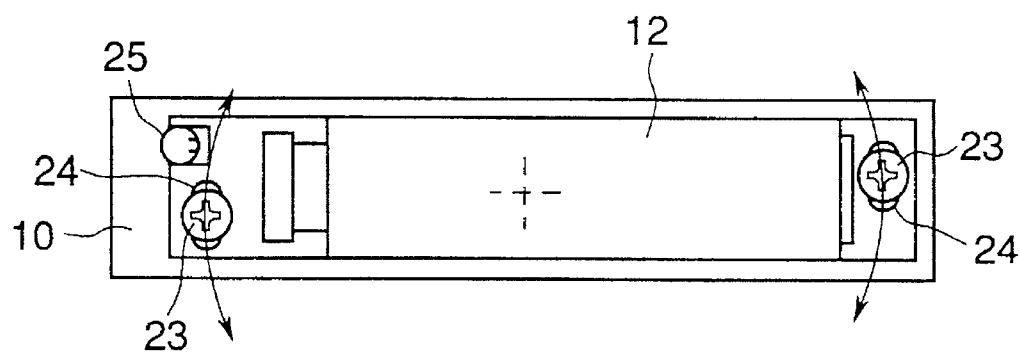
FIG. 9 is a rear-side view of beam rotation adjusting means in a second embodiment of the present invention.

FIG. 9 shows a second embodiment of the present invention, in which the rotatable support structure is the same as that in the foregoing first embodiment, but the beam rotation adjusting means is composed of a cylindrical stepped pin 25 with staggered axes (hereinafter called eccentric pin) for achieving adjustment in an easier and more exact manner. More specifically, on a lateral end portion of the fixed optical unit 12 there is provided a notch for accommodating the external periphery of the eccentric pin 25, and the frame 11 of the apparatus is provided with a hole for accepting the end of the eccentric pin 25 in a position approximately corresponding the above-mentioned notch of the frame 11. After the eccentric pin 25 is inserted into the hole, it is rotated about the front end thereof, whereby the fixed optical unit 12 can be rotated about the optical axis with respect to the frame 11 of the apparatus. After the completion of adjustment, the fixed optical unit 12 is fixed, as in the foregoing embodiment, to the frame 11 of the apparatus with the screws 23.

Figure 10:
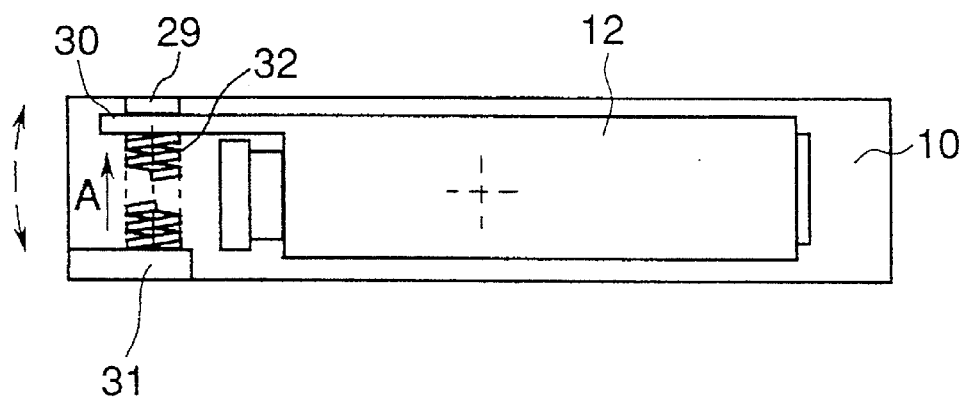
FIG. 10 is a rear-side view of beam rotation adjusting means in a third embodiment of the present invention.
Figure 11:
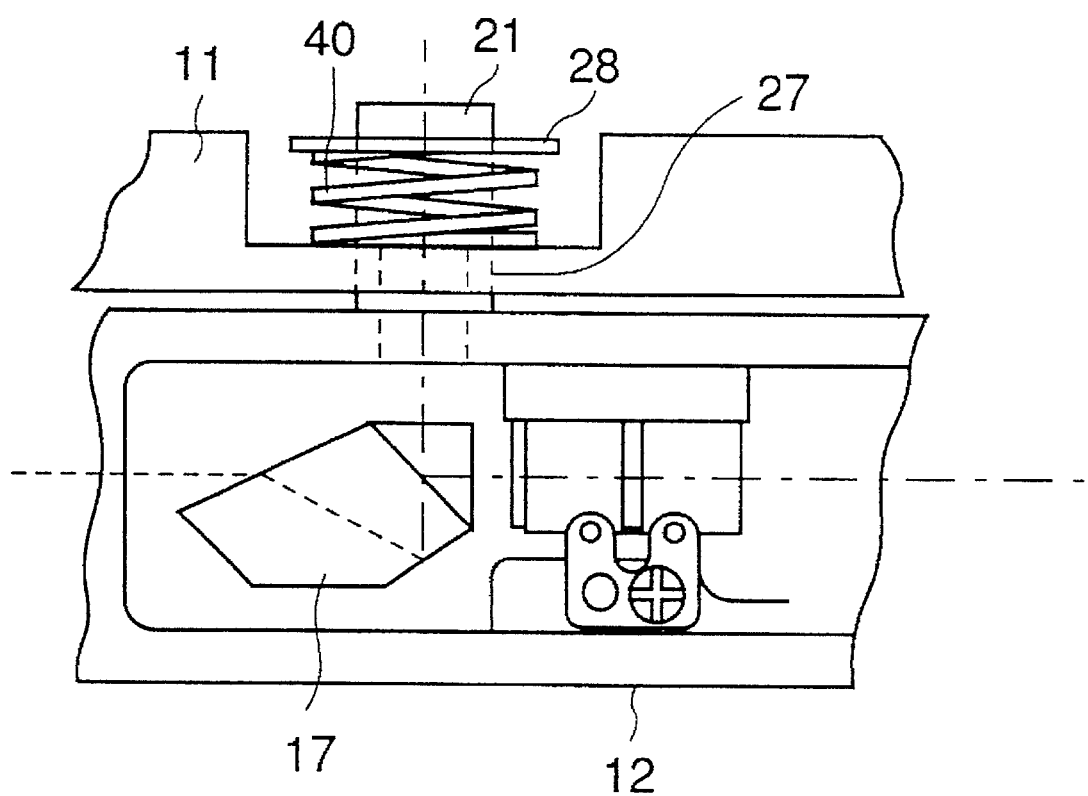
FIG. 11 is a plan view of a rotatable support part for the fixed optical unit in the third embodiment.

FIG. 10 illustrates another embodiment for further facilitating the beam rotation adjustment of the fixed optical unit 12. As shown in FIG. 11, the fixed optical unit 12 and the frame 11 of the apparatus are rotatably linked by an elastic member. The linking means is composed of a cylindrical projection 21 protruding from a support portion 27 provided on the frame 11, and the elastic member is composed of a coil spring as illustrated, or a plate spring or a rubber member, maintained in place by a ring 28.

A horizontal reed portion 30 extends from an upper (or lower) side of an end of the fixed optical unit 12, with a hole for accommodating a screw 29. Also a horizontal reed portion 31 is provided on the frame 11 of the apparatus at an opposed side (lower side in the drawing) to the above-mentioned reed portion 30, and the reed portion 31 is provided with a threaded hole for engaging with the screw 29, in a position vertically corresponding to the screw hole of the reed portion 30 of the fixed optical unit. Thus, the screw 29 is inserted from above the reed portion 30 of the fixed optical unit, and engages with the threaded hole of the reed portion 31 of the frame of the apparatus.

Between the reed portions 30, 31 there is provided an elastic member 32 for biasing the fixed optical unit in a direction A. The elastic member 32 can be composed of a coil spring as explained before, or otherwise, of a plate spring. The beam rotation adjustment in this embodiment can be achieved by vertically moving the reed portion 30, by rotating the screw 29 against the biasing force of the coil spring.

As explained in the foregoing, in an optical information recording/reproducing apparatus for information recording and/or reproduction, provided with a beam rotation adjusting mechanism for adjusting the positional relationship of plural independent laser beams from a laser array, so as to simultaneously irradiate a track of an optical recording medium with the plural laser beams, the beam rotation adjusting mechanism according to the present invention is provided at the mounting portion of the fixed-side optical head to the frame of the apparatus. Consequently the optical unit can dispense with the conventional complicated mechanism, and the beam rotation adjustment can be achieved with a simple configuration. Besides the entire apparatus can be made thinner and with a low cost.

Also, the beam rotation adjustment can be easily achieved with a simple structure, by separating the fixed-side optical head and the frame of the apparatus and by rotating the fixed-side optical head about the emerging optical axis. Furthermore, a beam rotating mechanism can be constructed with a simpler structure, by forming a hollow cylindrical projection, coaxial with the optical axis, at the light exit portion of the fixed-side optical head and rendering the optical unit rotatable along the external periphery of the cylindrical projection, with respect to the frame of the apparatus.

Furthermore, the beam rotation adjustment can be achieved in easier and more precise manner by rotating the fixed-side optical unit with an eccentric pin. Also the adjustment can be made easier by biasing an elastic member in a rotating direction and rotating the optical unit by rotation of a screw member against the elastic force of the elastic member, and such method also dispenses with the fixing operation after the adjustment.

What is claimed is:

1. An optical information recording/reproducing apparatus comprising:

a light source unit for emitting a plurality of light beams, for information recording and/or reproduction, toward an optical information recording medium;

an optical head on which said light source unit is mounted;

a frame of the apparatus on which said optical head is mounted; and an adjusted mechanism for adjusting the positional relationship of the a plurality of light beams relative to the optical information recording medium, said adjusting mechanism being formed at the mounting portion of said apparatus at which said optical head is mounted to said frame.

2. An apparatus to claim 1, wherein said adjusting mechanism effects rotating adjustment of said optical head.

3. An optical information recording/reproducing apparatus comprising:

a light source unit for emitting a plurality of light beams, for information recording and/or reproduction, toward an optical information recording medium;

an fixed-side optical head on which said light source is mounted;

a movable-side optical head for guiding the plurality of light beams from said fixed-side optical head to the optical information recording medium;

a frame of the apparatus, for movably supporting said movable-side optical head, said frame supporting said fixed-side optical head, and an adjusting mechanism for adjusting the positional relationship of the plurality of light beams relative to the optical information recording medium, said adjusting mechanism being formed at the mounting portion of said apparatus at which said fixed-side optical head is mounted to said frame.

4. An apparatus according to claim 3, wherein said adjusting mechanism effects rotating adjustment of said fixed-side optical head.

5. An apparatus according to claim 3, further comprising:

drive means for rotating the optical information recording medium.

6. An apparatus according to claim 5, wherein said adjusting mechanism effects rotating adjustment of said fixed-side optical head and has a rotary axis perpendicular to the rotating axis of said drive means.

7. A method of adjusting the positional relationship of a plurality of light beams relative to an optical information recording medium in an optical information recording/reproducing apparatus for effecting recording of information on and/or reproduction of information from the optical information recording medium using the plurality of light beams, said method comprising the steps of:

mounting onto an optical head a light source unit for generating the plurality of light beams for recording information on and/or reproducing information from the optical information recording medium;

mounting the optical head onto a frame of the apparatus; and rotating the optical head relative to the frame of the apparatus so as to adjust the positional relationship of the plurality of light beams relative to the optical information recording medium.

8. A method of adjusting the positional relationship of a plurality of light beams relative to an optical information recording medium in an optical information recording/reproducing apparatus for effecting recording of information on and/or reproduction of information from the optical information recording medium using the plurality of light beams, said method comprising the steps of:

mounting onto a fixed-side optical head a light source unit for generating the plurality of light beams for recording of information on and/or reproduction of information from the optical information recording medium;

movably supporting on a frame of the apparatus a movable-side optical head for guiding the plurality of light beams from the fixed-side optical head onto the optical information recording medium;

mounting the fixed-side optical head onto the frame of the apparatus; and rotating the fixed-side optical head relative to the frame of the apparatus so as to adjust the positional relationship of the plurality of light beams relative to the optical information recording medium.

* * * * *

UNITED STATES PATENT AND TRADEMARK OFFICE
CERTIFICATE OF CORRECTION

PATENT NO. : 5,648,945
DATED : July 15, 1997
INVENTOR(S) : RYUICHI IWANAGA

It is certified that error appears in the above-identified patent and that said Letters Patent is hereby corrected as shown below:

COLUMN 2:
    Line 32, "then" should read --is then--.

COLUMN 5:
    Line 17, "have" should read --have to--.

COLUMN 5:
    Line 44, "corresponding" should read --corresponding to--

COLUMN 6:
    Line 23, "Consequently" should read --Consequently,--.
    Line 59, "a" should be deleted.

COLUMN 7:
    Line 4, "an" should read --a--.

Signed and Sealed this

Twenty-fourth Day of February, 1998

Attest:

BRUCE LEHMAN

*Attesting Officer*      *Commissioner of Patents and Trademarks*